C. B. CHICKEN AND J. H. THAIN.
ELECTRICAL SIGNALING APPARATUS.
APPLICATION FILED APR. 15, 1919.
1,353,025.
Patented Sept. 14, 1920.
2 SHEETS—SHEET 1.
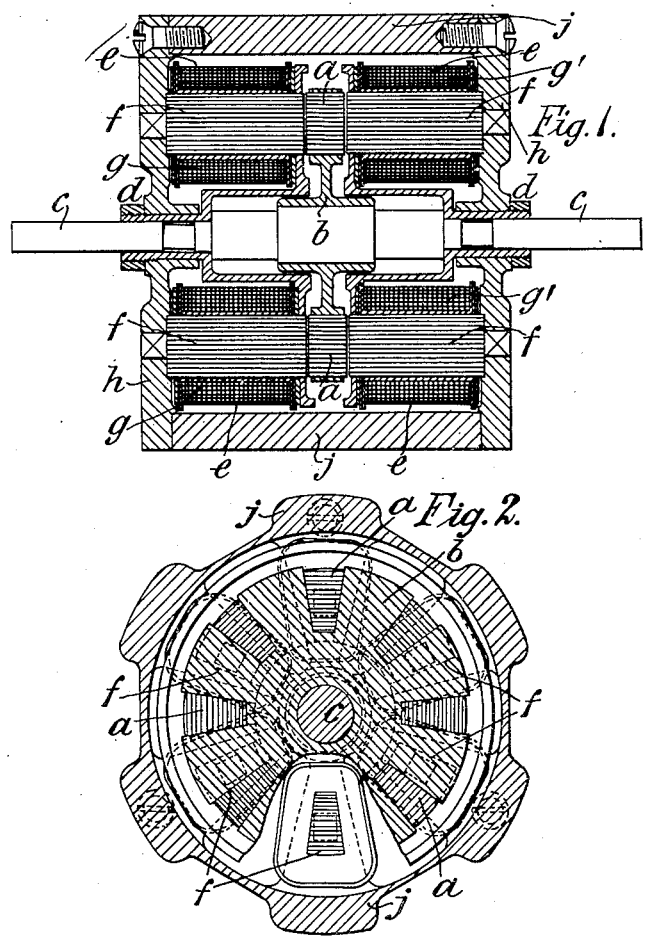
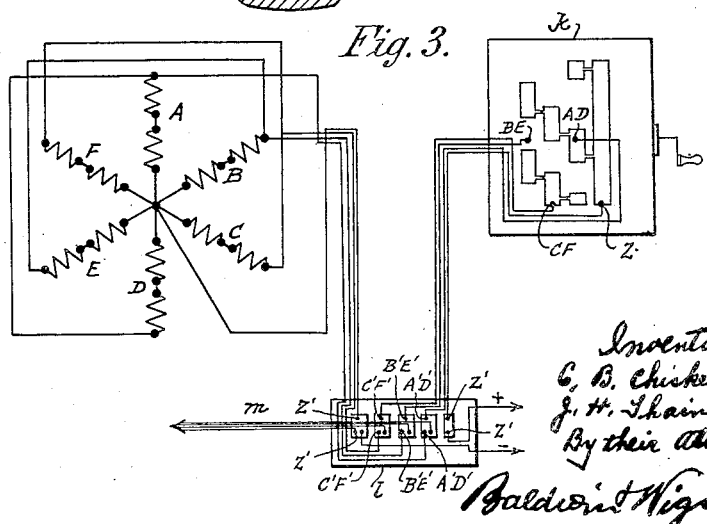

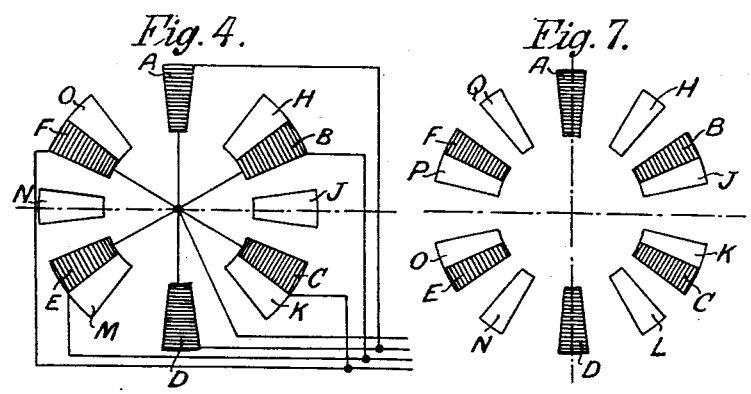
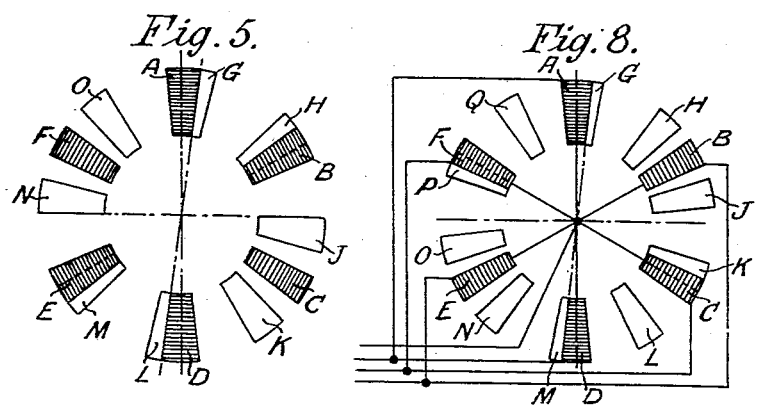
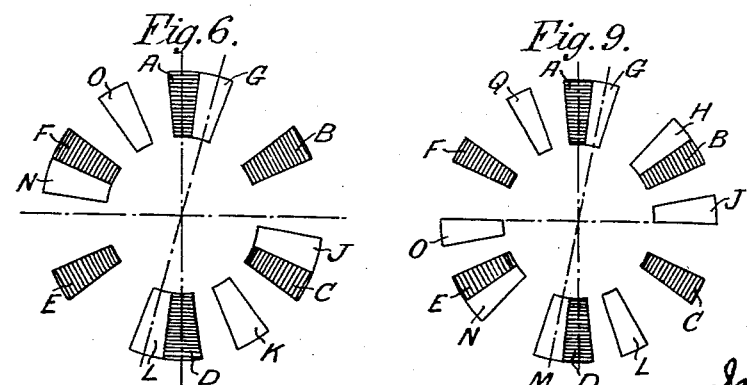

UNITED STATES PATENT OFFICE.

CHRISTOPHER BRUNSWICK CHICKEN AND JOSEPH HARRY THAIN, OF NEWCASTLE-UPON-TYNE, ENGLAND, ASSIGNORS TO SIR W. G. ARMSTRONG WHITWORTH AND COMPANY, LIMITED, OF NEWCASTLE-UPON-TYNE, ENGLAND.

ELECTRICAL SIGNALING APPARATUS.

1,353,025.   Specification of Letters Patent.   Patented Sept. 14, 1920.

Application filed April 15, 1919. Serial No. 290,177.

*To all whom it may concern:*

Be it known that we, CHRISTOPHER BRUNSWICK CHICKEN and JOSEPH HARRY THAIN, subjects of the King of Great Britain, residing at Elswick Works, Newcastle-upon-Tyne, England, have invented new and useful Improvements in Electrical Signaling Apparatus, of which the following is a specification.

This invention relates to electrical signaling apparatus in which a step-by-step electrical motor is employed for actuating a pointer or the like which indicates the signals.

The object of this invention is to construct a step-by-step motor that a large number of equal and definite impulses can be received at a high rate without the motor getting out of step with the transmitter switch at the sending station, and that a strong magnetic field is set up, imparting a large torque to the rotating armatures overcoming any partiality to sticking or to sluggishness of the moving parts, and that the magnetic field is so arranged at each impulse that all over-running of the moving parts is obviated, insuring a definite step-by-step motion.

According to this invention a set of armatures are equally spaced around an axis and two sets of electro-magnets are both equally spaced around the same axis, the number in each set being even and the number in the set of armatures being different from and not a multiple of the number in each of the two sets of electro-magnets the coils on each pair of magnets being connected in series with one another and in parallel with the coils diametrically opposite to them.

The accompanying drawings illustrate an electric motor made in accordance with this invention, Figure 1 being a longitudinal sectional view of the motor, Fig. 2 a transverse section, and Figs. 4–9 diagrams.

Figs. 1 and 2 are sections at right angles to each other and Fig. 3 is a diagram illustrating the arrangement of a receiver motor and a transmitting switch. Figs. 4, 5 and 6 are diagrams illustrating the successive steps of the armatures for a motor having 48 impulses for each revolution, and Figs. 7, 8 and 9 are similar views of a motor having 60 impulses.

An even number of armatures $a$ is mounted upon a wheel $b$ on a shaft $c$ capable of turning in bearings $d$. Upon the shaft $c$ is a pointer (not shown) for indicating the signals transmitted. The armatures $a$ are preferably made of laminated soft iron and are insulated magnetically from one another. On each side of the wheel $b$ are six electro-magnets $e$ having cores $f$ and windings $g$ $g'$, the cross section of each core $f$ and armature $a$ being identical with one another. The magnets $e$ are fixed to iron end frames $h$ connected together by a soft iron yoke $j$. When the wheel $b$ is turned, each armature $a$ passes successively between the two opposite magnet cores $f$ forming a magnetic path which is completed by the end frames $h$ and the yoke $j$.

In Fig. 3 the coils are marked A, B, C, D, E and F as in Fig. 4. The terminals of the circuits of the pairs of coils AD, BE and CF are marked AD, BE and CF in the transmission switch K whose drum is shown diagrammatically and are marked A'D' B'E' and C'F' in the junction box 1. The terminals of the main circuit are marked Z Z' respectively. $m$ are leads to a parallel receiver.

In the diagrams, Figs. 4 to 6 and 7 to 9, the six magnet cores are marked A B C D E F, and in the first diagrams Figs. 4 to 6 the eight armatures are marked G R J K L M N O and in the second diagrams Figs. 7 to 9 the ten armatures are similarly marked with the addition of armatures P Q. In Figs. 4 to 6, when the magnets are successively energized by means of a transmitting switch $k$ in the cycle AD, Fig. 4; AD and BE, Fig. 5; BE, Fig. 6; BE and CF; CF; CF and DA, the armatures are moved clockwise. If the cycle is repeated eight times, forty-eight impulses, that is, eight times the six impulses just mentioned, are obtained for one revolution of the motor, a similar result being obtained if the direction of rotation is reversed.

Similarly in Figs. 7 to 9, when the magnets are energized in the cycle AD, Fig. 7; AD and CF, Fig. 8; CF, Fig. 9; CF and EB; EB; EB and AD, the armatures are turned. If this is repeated ten times, sixty impulses are obtained for one revolution of the motor.

What we claim is:—

1. In an electrical motor, a set of armatures equally spaced around an axis, and two sets of electro-magnets, each set being equally spaced around the same axis, the number in each set being even and the number in the set of armatures being different from and not a multiple of the number in each of the two sets of electro-magnets, the coils of each pair of magnets being connected in series with one another and in parallel with the coils diametrically opposite to them.

2. In an electrical motor, a set of armatures equally spaced around an axis, and two sets of electro-magnets each set being equally spaced around the same axis, the number in each set being even and the number in the set of armatures being different from and not a multiple of the number in each of the two sets of electro-magnets, the coils of each pair of magnets being connected in series with one another and in parallel with the coils diametrically opposite to them.

CHRISTOPHER BRUNSWICK CHICKEN.
JOSEPH HARRY THAIN.